(12) United States Patent
Seeberger

(10) Patent No.: US 6,592,505 B2
(45) Date of Patent: Jul. 15, 2003

(54) DEVICE FOR FORMING A TUBE PROVIDED WITH GUSSETS

(75) Inventor: Achim Seeberger, Lengerich (DE)

(73) Assignee: Windmoeller & Hoelscher, Lengerich (DE)

( * ) Notice: Subject to any disclaimer, the term of this patent is extended or adjusted under 35 U.S.C. 154(b) by 22 days.

(21) Appl. No.: 09/873,207

(22) Filed: Jun. 5, 2001

(65) Prior Publication Data

US 2002/0052277 A1 May 2, 2002

(30) Foreign Application Priority Data

Jun. 5, 2000 (DE) .......................................... 100 27 820

(51) Int. Cl.$^7$ ............................................... B31C 1/00
(52) U.S. Cl. ........................ 493/269; 493/309; 493/437; 493/476
(58) Field of Search ................................ 493/269, 309, 493/475, 476, 447, 437, 405

(56) References Cited

U.S. PATENT DOCUMENTS

| | | | | |
|---|---|---|---|---|
| 4,655,738 A | * | 4/1987 | Jansson | 493/269 |
| 4,915,680 A | * | 4/1990 | Nestle et al. | 493/417 |
| 4,925,440 A | * | 5/1990 | Muller | 493/466 |
| 5,186,707 A | * | 2/1993 | Barta | 493/439 |
| 5,853,360 A | * | 12/1998 | Jeffrey et al. | 493/178 |
| 6,019,713 A | * | 2/2000 | Scypinski et al. | 493/302 |

FOREIGN PATENT DOCUMENTS

DE 36 40 219 1/1988

* cited by examiner

*Primary Examiner*—Eugene Kim
(74) *Attorney, Agent, or Firm*—Jacobson Holman PLLC

(57) ABSTRACT

A device for forming a tube provided with gussets out of a single- or multi-layer, continuously pre-stressed material web consists of divided upper and lower folding plates mounted on the machine frame that determine the width of the tube to be formed when it is laid flat, which approach one another with regard to their distance from one another approximately in the shape of a wedge and in a manner perpendicular to the plane of the tube to be formed, beginning from the approach sides, with the wedge angle being adjustable, and with the device having two rows of insertion discs respectively mounted on carriers reaching between the folding plates for forming the gussets, whose distance from one another may be adjusted in the plane of the tube to be formed. In order to decrease the number of adjustment procedures when changing the format, an adjustment device of both rows of insertion discs on the middle level between the upper and lower folding plates is directly or indirectly connected to a device for displacing both rows of insertion discs in such a manner that the angle formed by the common tangents of both rows of insertion discs is sufficiently large that the insertion discs essentially firmly supply the interior folding edges of the gussets.

6 Claims, 6 Drawing Sheets

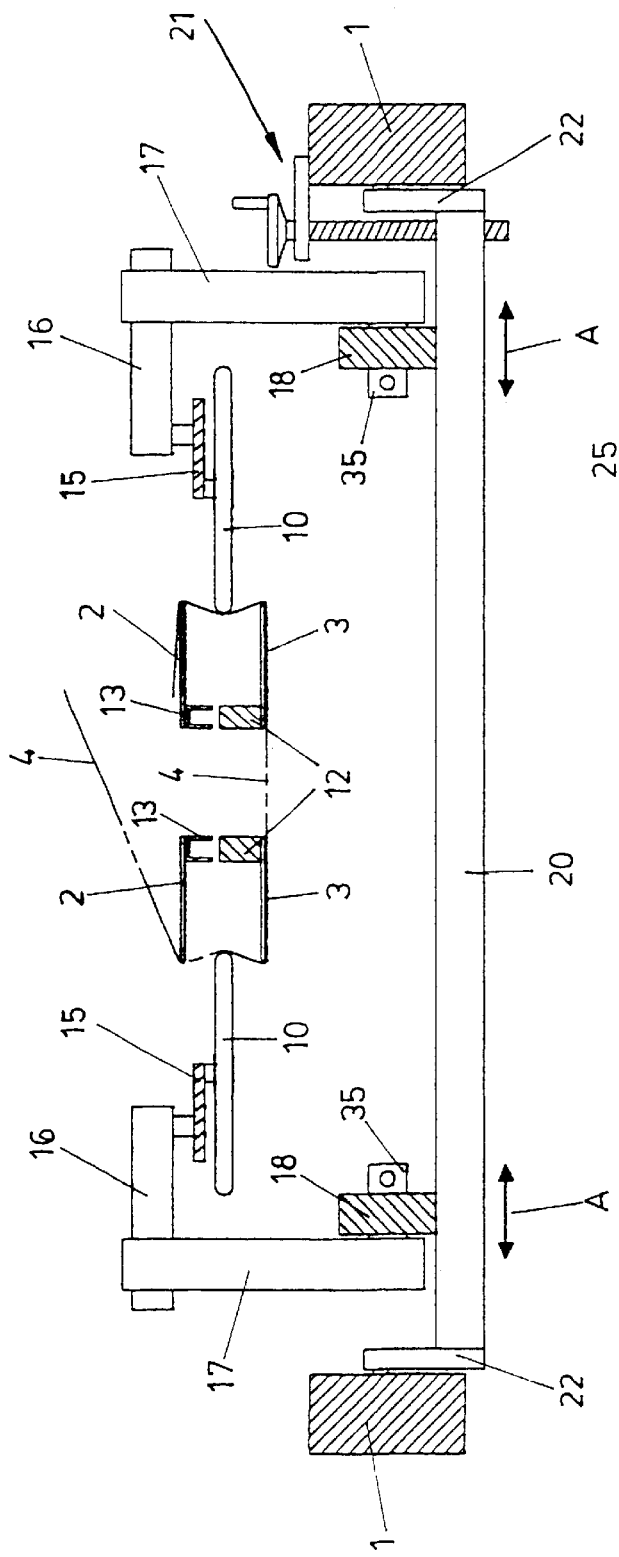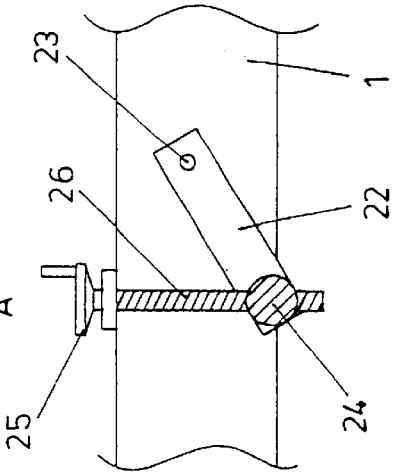
FIG. 3
FIG. 4

1

DEVICE FOR FORMING A TUBE PROVIDED WITH GUSSETS

BACKGROUND OF THE INVENTION

1. Field of the Invention

The invention relates to a device for forming a tube provided with gussets out of a single- or multi-layer, continuously pre-tensed material web having divided upper and lower folding plates that determine the width of the tube when it is laid flat and are mounted on the machine frame, with the web being deflected by the entrance sides of these plates in order to raise the edge regions that are to be driven inwards, which entrance sides may be adjusted in their distance from one another to correspond to the width of the tube to be formed and which plates approach one another with regard to their distance from one another approximately in the shape of a wedge and in a manner perpendicular to the plane of the tube to be formed, beginning from the approach sides, with the wedge angle being adjustable, and with the device having two rows of insertion discs respectively mounted on carriers reaching between the folding plates for forming the gussets, whose distance from one another may be adjusted in the plane of the tube to be formed.

2. Description of the Related Art

One device of this type is known from DE 36 40 219 C1. In the known device, the folding plates and the rows of insertion discs engaging between the folding plates must be adjusted to correspond to the width of the tube to be produced when it is laid flat, and to correspond to the depth of the gussets; here, it must be taken into account that, corresponding to the wedge angle between the folding plates, the rows of insertion discs must approach the material web in the direction of the exit, which requires a particularly expensive adjustment.

SUMMARY OF THE INVENTION

The object of the invention is therefore to create a device of the type mentioned at the outset in which the adjustment work required for changing the format of the tube to be formed, i.e., changing the width and/or the depth of the gussets, is simplified.

This object is attained according to the invention in that an adjustment device for adjusting both rows of insertion discs is connected on the middle level between the upper and lower folding plates directly or indirectly to a device for displacing both rows of insertion discs in such a way that the angle formed by the common tangents of the two rows of insertion discs is sufficiently large that the insertion discs essentially firmly supply the interior folding edges of the gussets.

It is useful for the device to comprise gear instruments, for example, lever gears, for displacing both rows of insertion discs.

In the device according to the invention, therefore, the adjustment device for adjusting both rows of insertion discs is connected in a geared manner the middle level between the upper and lower folding plates and/or the holding devices carrying or storing both rows of insertion discs to an adjustment device for displacing both rows of insertion discs in the crosswise direction; they are connected in such a way that the pivoting motion for adjusting the insertion discs in the middle level, i.e., the vertical pivoting motion of both rows of insertion discs in the horizontal middle level, is overlapped with a pivoting motion of both rows of insertion discs in the middle level in such a way that the insertion discs follow the transverse progression of the interior folding edges due to the wedge angle of the folding plates.

In order to adjust both rows of insertion discs on the middle level between the upper and lower folding plates, it is useful for the carriers of both rows to be mounted on two capping pieces that are mounted on the machine frame in the region of the raising of the folding plates such that they may be pivoted around a crosswise axis and that are provided on the approach side with an adjustment device that pivots one of the capping pieces, with the carriers being mounted on the capping pieces such that they may be pivoted around a vertical axis in the exit region and being movable relative to the capping pieces on the approach side in the plane of the insertion discs by means of a lever mechanism that transfers the pivoting motion of the capping pieces onto the carriers. Here, of course, the lever mechanism should be structured in such a way that the pivoting motion of the capping pieces is transferred onto the carriers of both rows of insertion discs such that they perform a pivoting motion that corresponds to the approach of the interior folding edges when inserting the gussets while the material web is traveling over the folding plates.

In accordance with a preferred embodiment, it is provided for the carrier of the rows of insertion discs to consist of L-shaped angle pieces and strip attached to the legs of these pieces running parallel to the folding plates, which legs carry the rows of insertion discs, with the vertical legs of both approach-side angle pieces being provided with horizontal pins that are guided into the bores of the capping pieces in a displaceable fashion, and with the angle regions of angle levers being mounted on the pins, whose legs carry on their ends rollers or sliding blocks which are guided on one side in a horizontal, frame-tight, crosswise guide and on the other side in vertical guides of the capping pieces. Here, the angle between the legs of the angle lever and the length of the legs as well as the guides for the guide device arranged on the end of the legs should be selected such that the desired displacement characteristic is achieved.

An exemplary embodiment of the invention shall be explained in greater detail in the following with reference to the drawings, which show:

DETAILED DESCRIPTION OF THE DRAWINGS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
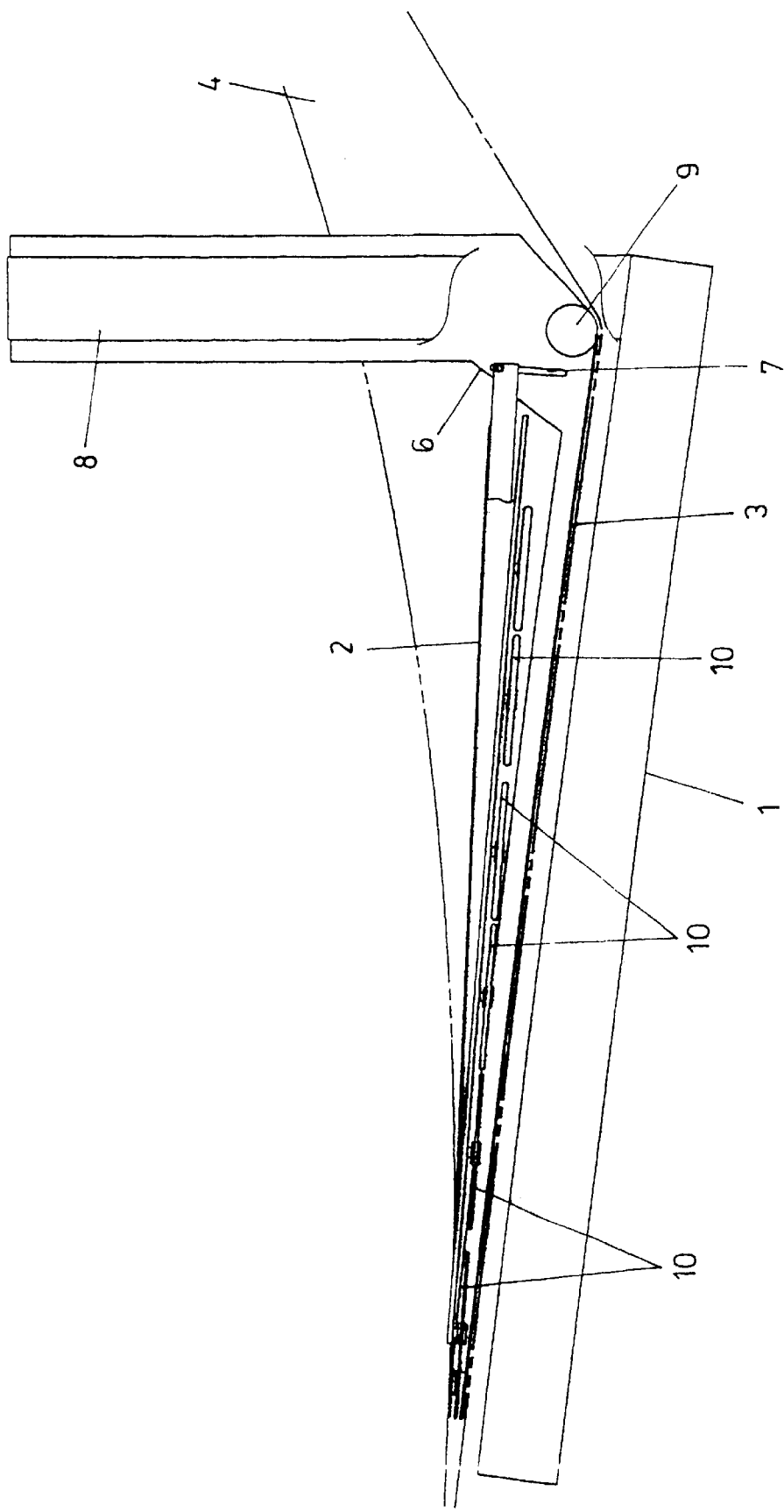
FIG. 1 a device for forming a tube provided with gussets in a schematic side view, FIG. 2 a top view of the device in accordance with FIG. 1, FIG. 3 a section through the device along the line III—III in FIG. 2, FIG. 4 a view of the device for adjusting the insertion discs on the middle level between two folding plates, FIG. 5 a section through the device along line V—V in FIG. 2, FIGS. 6 and 7 sections through the device along the line VI—VI in FIG. 2 with different displacement paths of the adjusting device for displacing both rows of insertion discs in their level, and FIGS. 8 and 9 depictions that show the different insertion depths of the insertion discs in the entrance region and in the exit region between the folding plates for gussets of differing depths.
Figure 5:
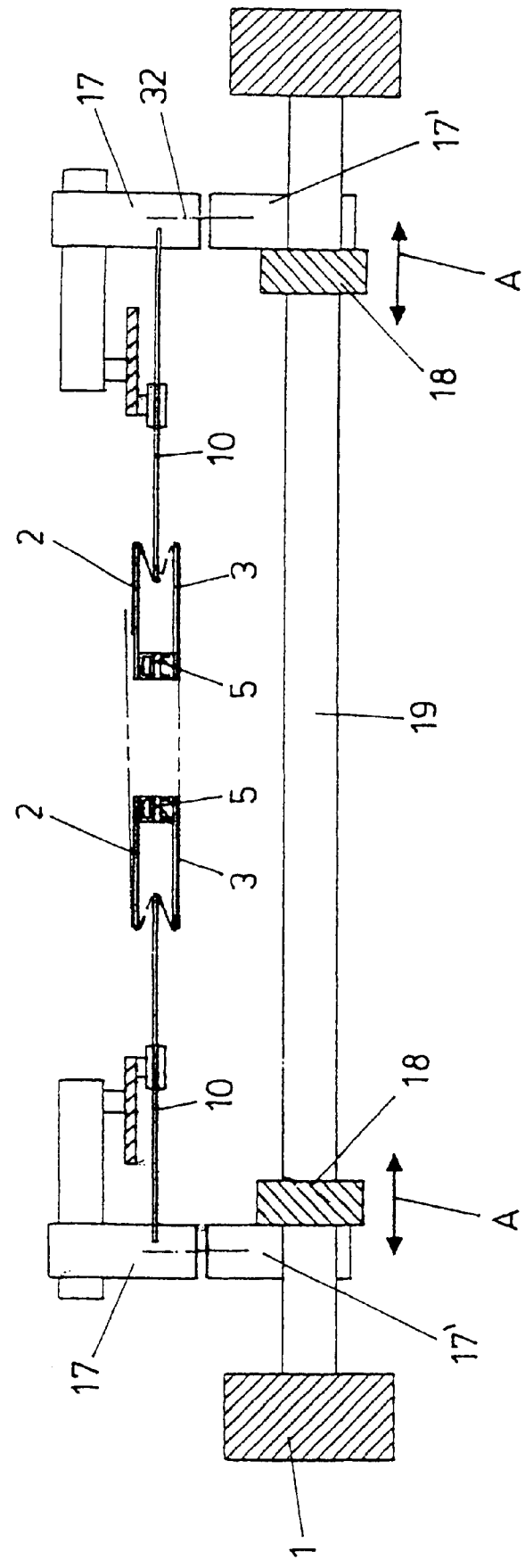

The machine frame 1 is schematically implied in the side view of the device for forming a tube provided with gussets in accordance with FIG. 1 in that the upper folding plates 2 and the lower folding plates 3 are held in place in a manner that is not shown. These folding plates approach one another beginning from the inlet side of the web 4 to be assembled into a gusset tube towards the exit side in the shape of a wedge. The upper folding plates 2 are mounted in such a way that they can be pivoted around a crosswise axis formed by bolts 5 (see FIG. 5). On the inlet side, the upper folding plates 2 may be displaced in longitudinal holes 7 by way of detachable clamping devices 6 in order to adjust the wedge angle between the upper and lower folding plates 2, 3; these longitudinal holes are located in the protruding legs 8 of frame parts that are displaceable in their opposing distance in the machine frame 1. Th tube web 4 travels in a known manner over a crosswise traverse 9 into the device for forming a tube in such a way that the lateral regions of the material web 4 are raised. When the material web 4 pulled through the tube forming station passes through, the gussets are formed by lateral rolls of insertion discs 10.

Figure 2:
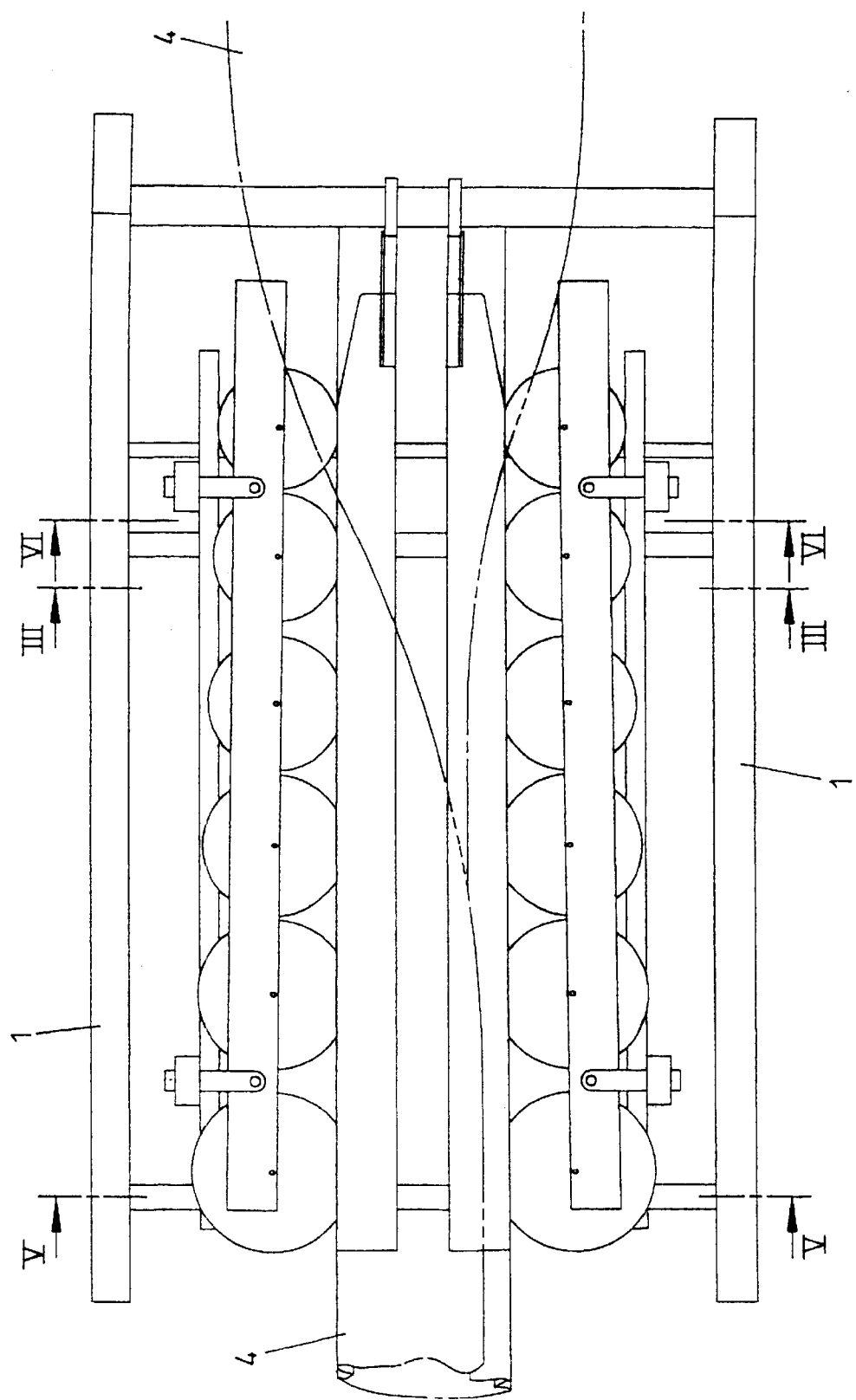

The lower folding plates 3 are attached in the manner shown in FIG. 3 to profile carriers 12, which can be overlapped by the U profiles 13, which are mounted in a pivotable manner and to which the upper folding plates 2 are attached. In order to form the tube, the material web 4 is folded around the folding plates 2, 3 in the manner shown in FIGS. 2, 3, and 5, with the gussets being inserted by the insertion discs gripping between the folding plates 2, 3.

The insertion discs 10 are mounted around vertical axes on lateral strips 15, which in turn are mounted by way of carrying pieces on the horizontal legs 16 of angle pieces whose vertical leg 17 is connected to capping pieces 18 running parallel to one another. In order to adjust the rows of insertion discs 10 to the desired gusset depth, either the horizontal legs 16 of the angle pieces are symmetrically adjustable to the vertical legs 17 of the angle pieces or the capping pieces 18 are mounted to be movable towards and away from one another in the direction of the double arrow A.

The capping pieces 18 are mounted on the exit end of the tube forming device such that they may be pivoted around a crosswise traverse 19 which is attached firmly to the frame. In the region of the entrance-side end of the tube forming device, the capping pieces 18 are supported on a crosswise traverse 20 that may be pivoted between the folding plates 2, 3 by way of an adjusting device 21 for adjusting the insertion discs 10 on the middle level. In order to adjust the height of the crosswise traverse 20, it is mounted in the machine frame 1 around pivot axes 23 by way of lateral rods 22, with the crosswise traverse 20 being provided with a pivotable spindle nut 24 into which a spindle 26 that can be activated by a had wheel 25 has been screwed, which is also mounted in a pivotable manner in the region of the hand wheel so that it may follow the pivoting motion of the traverse 20.

Figure 8:
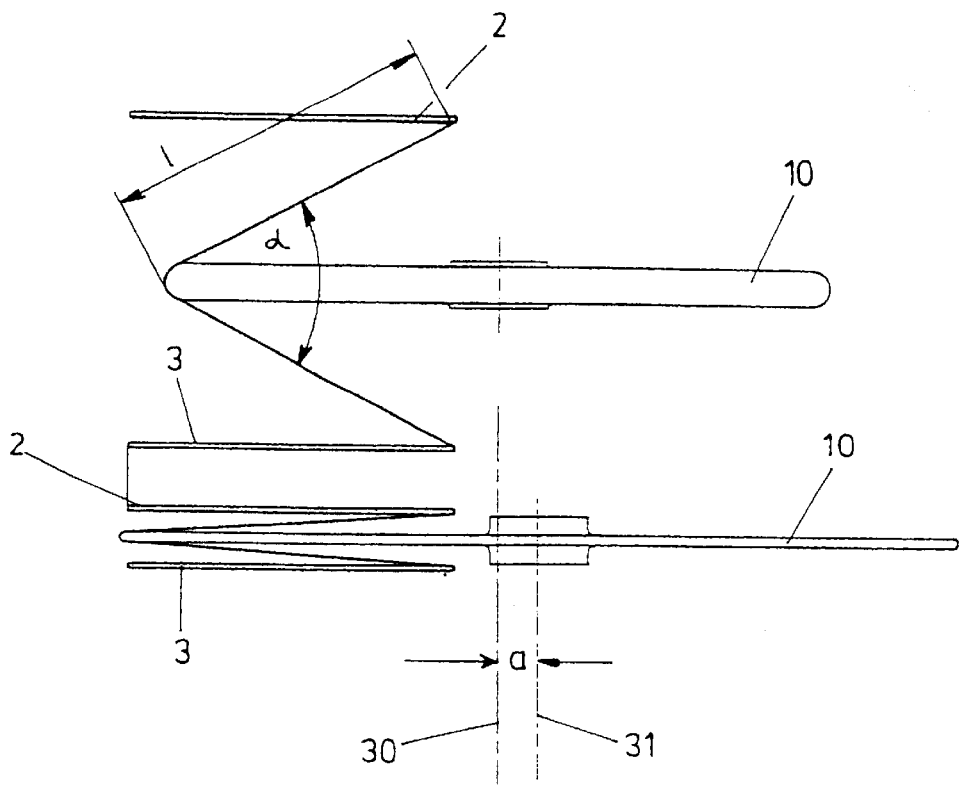
Figure 9:
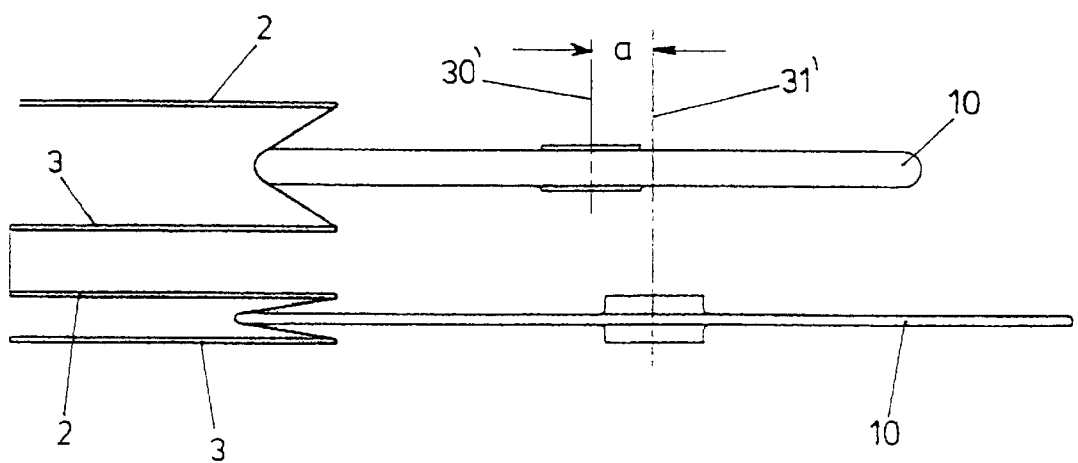

As can be seen from FIGS. 8 and 9 for gussets of different depths, the insertion discs 10 insert increasingly deeper between the folding plates 2, 3 beginning from the entrance side of the tube forming device in the direction of the exit side. The displacement of the rotational axes of the inlet discs 10 between the entrance side and the exit side of the tube forming device is implied in FIG. 8 by the corresponding dashed lines 30, 30' and 31, 31'. The change in the displacement a between the entrance-side and exit-side insertion discs results from the changing insertion depth cos α/2×leg length I of the gussets. This displacement a must be compensated by correspondingly pivoting both rows of insertion discs. In order to be able to perform this compensation, the upper sections of the vertical legs 17 can be rotated around vertical pivot axes 32 relative to the lower sections 17' in the manner shown in FIG. 5, with the lower sections 17' being firmly attached to the capping pieces 18.

Figure 6:
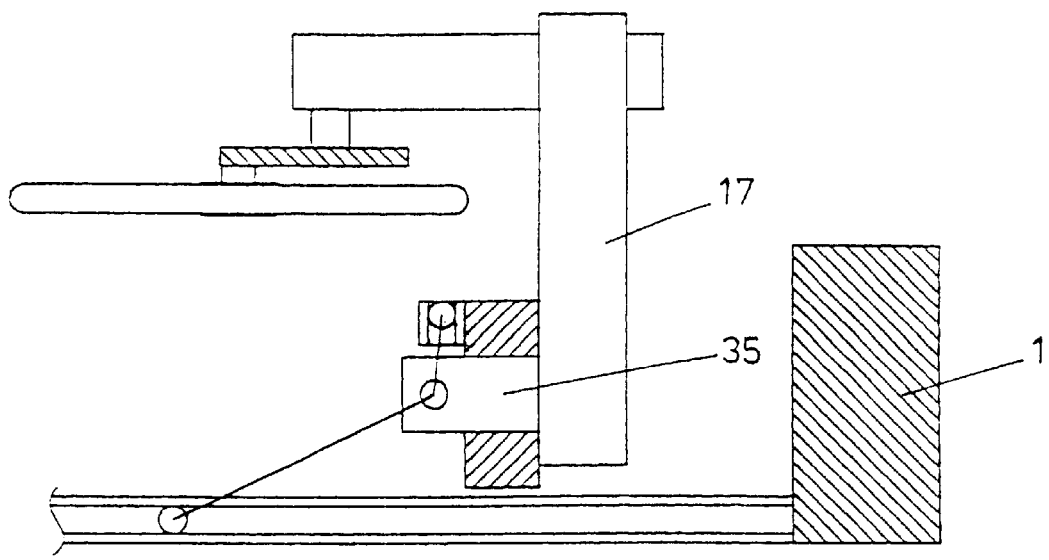
Figure 7:
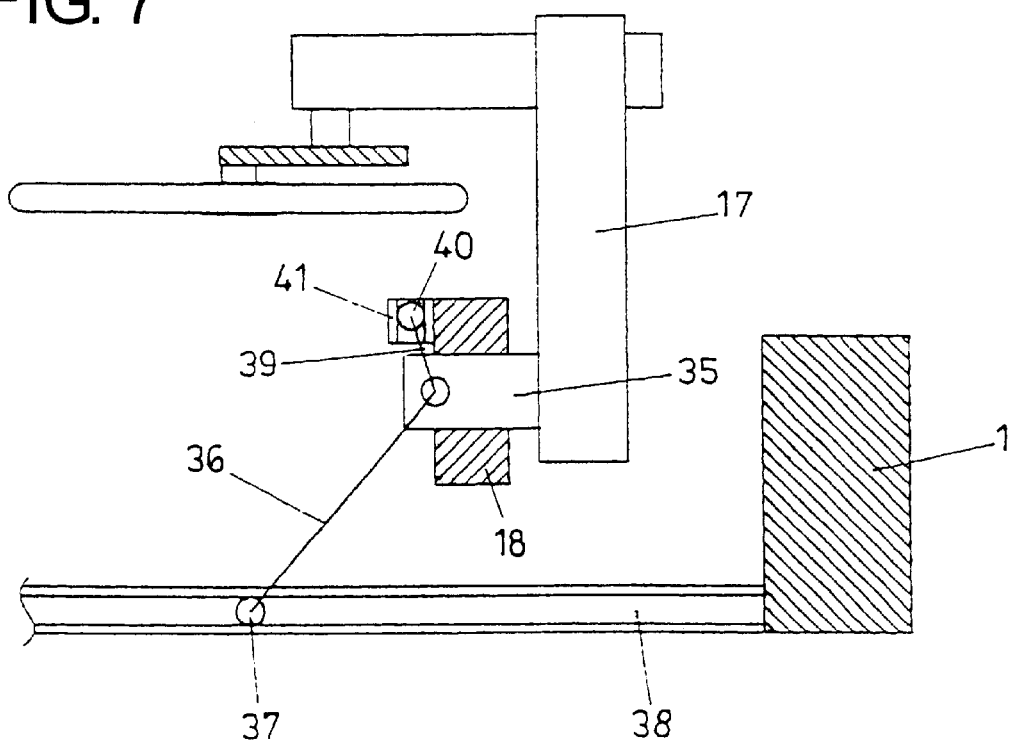

In the entrance region, the vertical legs 17 of the angle pieces are provided with pins 35 in an angular fashion that are guided into bores of the capping pieces 18 in the manner shown in FIGS. 6 and 7 such that they can be displaced in a crosswise manner. For the purpose of crosswise displacement and/or for pivoting the angle pieces, the pins 35 are connected in a jointed manner to the angle region of an angle lever whose longer leg 36 carries a roller 37 on its free end that is guided in a guide rail 38 running crosswise and fixed to the frame. The upper leg 39 of the angle lever carries a roll 40 on its free end that is guided in a vertical guide 41 that is firmly connected to the capping pieces 18. The angle between the arms 36, 39 of the angle lever as well as the length of the arms and/or legs 36, 39 and the arrangement of the guide rails 38, 41 are selected in such a way that a pivoting of the angle pieces occurs in such a manner that the rows of insertion discs 10 are displaced and/or pivoted during insertion on the middle level between the folding plates in such a manner that the interior tangents of the insertion discs essentially follow the middle folding edges of the gussets to be inserted.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A device for forming a tube provided with gussets out of a single-layer or multi-layer, continuously pre-stressed material web comprising:

divided upper and lower folding plates mounted in a machine frame that determine a width of the tube when it is laid flat and over whose entrance sides the web is deflected in order to raise overlapping edge regions to be pressed in, said plates being adjustable in their distance from one another corresponding to the width of the tube to be formed and approaching one another in a direction of an exit region, at a right angle to a tube-forming plane and approximately in the shape of a wedge with an adjustable wedge angle;

two rows of insertion disks, each mounted on carriers and engaging in a middle level between the upper and lower folding plates for forming gussets, a distance between said rows being adjustable in the tube-forming plane; and an adjusting device for both rows of insertion disks on the middle level between the upper and lower folding plates and connected to a device for displacing both rows of insertion disks in such a way that an angle formed by common tangents of both rows of insertion disks is sufficiently large that the insertion disks essentially firmly supply interior folding edges of the gussets, said carriers in said exit region being secured on capping pieces mounted to said frame such that said capping pieces can pivot around a crosswise axis while said carriers can pivot around a vertical axis, said carriers in an entrance region being pivotally mounted on said capping pieces and movable relative thereto in the plane of the insertion disks by a lever mechanism.

2. A device for forming a tube provided with gussets out of a single-layer or multi-layer, continuously pre-stressed material web comprising:

divided upper and lower folding plates mounted in a machine frame that determine a width of the tube when it is laid flat and over whose entrance sides the web is deflected in order to raise overlapping edge regions to be pressed in, said plates being adjustable in their distance from one another corresponding to the width of the tube to be formed and approaching one another in a direction of an exit side, at a right angle to a tube-forming plane and approximately in the shape of a wedge with an adjustable wedge angle;

two rows of insertion disks, each mounted on carriers secured in a capping piece and engaging in a middle level between the upper and lower folding plates for forming gussets, a distance between said rows being adjustable in the tube-forming plane; and an adjusting device for both rows of insertion disks on the middle level between the upper and lower folding plates and connected to a device for displacing both rows of insertion disks in such a way that an angle formed by common tangents of both rows of insertion disks is sufficiently large that the insertion disks essentially firmly supply interior folding edges of the gussets, said carriers including L-shaped angle pieces and strips mounted thereto parallel to the folding plates, a vertical leg of said L-shaped angle pieces being provided with a horizontal pin displaceably guided into a bore in said capping piece, an angle lever being mounted on said pin with a leg of said angle lever carrying rollers which are guided in a first side on a horizontal crosswise guide fixed to said frame and on a second side in a vertical guide of said capping pieces.

3. A device for forming a tube provided with gussets out of a single-layer or multi-layer, continuously pre-stressed material web comprising:

divided upper and lower folding plates mounted in a machine frame that determine a width of the tube when it is laid flat and over whose entrance sides the web is deflected in order to raise overlapping edge regions to be pressed in, said plates being adjustable in their distance from one another corresponding to the width of the tube to be formed and approaching one another in a direction of an exit region, at a right angle to a tube-forming plane and approximately in the shape of a wedge with an adjustable wedge angle;

two rows of insertion disks, each mounted on a generally horizontal arm of an L-shaped carrier and engaging in a middle level between the upper and lower folding plates for forming gussets, a distance between said rows being adjustable in the tube-forming plane, said carrier being pivotal around a crosswise axis and having, in said exit region, a generally vertical leg with an upper section and a lower section, said lower section secured on a capping piece mounted to said frame, said upper section rotatable relative to said lower section around a vertical axis pivot.

4. The device as set forth in claim 3, wherein said carrier in an entrance region is pivotally mounted on said capping piece and movable relative thereto in the plane of the insertion disks by a lever mechanism.

5. The device as set forth in claim 3, wherein in an entrance region of said device said vertical leg of said carrier is provided with a horizontal pin displaceably guided into a bore in said capping piece.

6. The device as set forth in claim 5, further comprising an angle lever mounted on said pin, a leg of said angle lever carrying rollers which are guided in a first side on a horizontal crosswise guide fixed to said frame and on a second side in a vertical guide of said capping piece.

\* \* \* \* \*